United States Patent
Chang et al.

(10) Patent No.: US 10,747,314 B1
(45) Date of Patent: Aug. 18, 2020

(54) TRACKING SYSTEM WITH INFRARED CAMERA

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/373,056

(22) Filed: Apr. 2, 2019

(51) Int. Cl.
| | | |
|---|---|---|
| G01J 5/00 | (2006.01) |
| G06F 3/01 | (2006.01) |
| G06T 7/246 | (2017.01) |
| G02B 27/01 | (2006.01) |
| G06T 5/00 | (2006.01) |
| H04N 5/225 | (2006.01) |
| G06T 7/73 | (2017.01) |

(52) U.S. Cl.
CPC .......... G06F 3/013 (2013.01); G02B 27/0101 (2013.01); G06T 5/002 (2013.01); G06T 7/246 (2017.01); G06T 7/73 (2017.01); H04N 5/2254 (2013.01); H04N 5/2256 (2013.01); G02B 2027/0138 (2013.01); G06T 2207/10048 (2013.01); G06T 2207/30201 (2013.01)

(58) Field of Classification Search
CPC ................ G06F 3/013; G02B 27/0101; G02B 2027/0138; G06T 7/246; G06T 5/002; G06T 7/73; G06T 2207/30201; G06T 2207/10048; H04N 5/2254; H04N 5/2256
See application file for complete search history.

(56) References Cited

U.S. PATENT DOCUMENTS

| | | | |
|---|---|---|---|
| 10,545,497 B1* | 1/2020 | Cui .................... | G06F 3/011 |
| 2008/0024602 A1* | 1/2008 | Linnenkohl .......... | G06T 7/0004 |
| | | | 348/128 |
| 2010/0283834 A1* | 11/2010 | Baker ................... | G01S 7/487 |
| | | | 348/46 |
| 2011/0228251 A1* | 9/2011 | Yee ...................... | G01S 17/36 |
| | | | 356/5.01 |
| 2015/0177382 A1* | 6/2015 | Vogel .................... | G01S 17/08 |
| | | | 250/203.2 |
| 2016/0006914 A1* | 1/2016 | Neumann ............. | G06F 3/0325 |
| | | | 348/78 |
| 2016/0335778 A1* | 11/2016 | Smits .................... | G01P 3/36 |
| 2017/0270375 A1* | 9/2017 | Grauer ................. | G01S 17/931 |
| 2018/0293739 A1* | 10/2018 | Gupta ................... | G06K 9/6256 |
| 2018/0343401 A1* | 11/2018 | Campbell ............. | G08G 5/0069 |

* cited by examiner

Primary Examiner — Kiho Kim
(74) Attorney, Agent, or Firm — Cantor Colburn LLP

(57) ABSTRACT

A system includes an infrared light source, an infrared camera, and a controller. The controller includes processing circuitry configured to control a pulse illumination of the infrared light source, capture a sequence of images from the infrared camera including infrared noise combined with a captured reflection of the pulse illumination, filter the infrared noise from the sequence of images based on a comparison of the captured reflection of the pulse illumination to an expected result of the pulse illumination, and track a feature of interest in the sequence of images after filtering of the infrared noise.

20 Claims, 4 Drawing Sheets

TRACKING SYSTEM WITH INFRARED CAMERA

INTRODUCTION

The subject disclosure relates to a tracking system with an infrared camera.

A head-up display (HUD) system can project an image viewable by a user. An eyebox can be a two-dimensional or three-dimensional region in space where the eyes of a user are expected to be located for images of a HUD to appear visible to the user. Complex images, such as augmented reality images, can be difficult to project into the eyebox without distortion being apparent to the user. Accordingly, it is desirable to provide image projection into the eyebox for a HUD that compensates for distortion effects.

SUMMARY

In one exemplary embodiment, a system includes an infrared light source, an infrared camera, and a controller. The controller includes processing circuitry configured to control a pulse illumination of the infrared light source, capture a sequence of images from the infrared camera including infrared noise combined with a captured reflection of the pulse illumination, filter the infrared noise from the sequence of images based on a comparison of the captured reflection of the pulse illumination to an expected result of the pulse illumination, and track a feature of interest in the sequence of images after filtering of the infrared noise.

In addition to one or more of the features described herein, the infrared light source, the infrared camera, and the controller can be associated with a head-up display.

In addition to one or more of the features described herein, the infrared light source can be configured to reflect off a windshield of a vehicle including the head-up display to an eyebox defining an expected viewing area of a user, and the captured reflection can include infrared light reflected off of the user and the windshield.

In addition to one or more of the features described herein, the infrared light source can be coupled to a housing of the head-up display, and the infrared camera is within the housing of the head-up display.

In addition to one or more of the features described herein, the infrared light source can be distributed as a plurality of light sources along an outer edge of the housing.

In addition to one or more of the features described herein, an optical spatial filter can be operably coupled to the infrared camera, where the optical spatial filter is configured to block light external to the eyebox.

In addition to one or more of the features described herein, a bandpass filter can be operably coupled to the infrared camera, where the bandpass filter is configured to filter non-infrared wavelengths.

In addition to one or more of the features described herein, filtering the infrared noise from the sequence of images can include performing a frequency domain analysis of the sequence of images to demodulate the infrared noise from the captured reflection of the pulse illumination, and the expected result of the pulse illumination can be used as demodulation reference signal.

In addition to one or more of the features described herein, the infrared light source can be controlled as s-polarized light.

In addition to one or more of the features described herein, the feature of interest can be an eye location of a user.

In another exemplary embodiment, a method includes controlling a pulse illumination of an infrared light source and capturing a sequence of images from an infrared camera. The sequence of images includes infrared noise combined with a captured reflection of the pulse illumination. The infrared noise from the sequence of images is filtered based on a comparison of the captured reflection of the pulse illumination to an expected result of the pulse illumination. A feature of interest in the sequence of images after filtering of the infrared noise is tracked.

In addition to one or more of the features described herein, the infrared light source, the infrared camera, and the controller can be associated with a head-up display.

In addition to one or more of the features described herein, the infrared light source can be configured to reflect off a windshield of a vehicle including the head-up display to an eyebox defining an expected viewing area of a user, and the captured reflection can include infrared light reflected off of the user and the windshield.

In addition to one or more of the features described herein, the infrared light source can be coupled to a housing of the head-up display, and the infrared camera is within the housing of the head-up display.

In addition to one or more of the features described herein, the infrared light source can be distributed as a plurality of light sources along an outer edge of the housing.

In addition to one or more of the features described herein, the method can include blocking light external to the eyebox by an optical spatial filter operably coupled to the infrared camera.

In addition to one or more of the features described herein, the method can include filtering non-infrared wavelengths by a bandpass filter operably coupled to the infrared camera.

In addition to one or more of the features described herein, filtering the infrared noise from the sequence of images can include performing a frequency domain analysis of the sequence of images to demodulate the infrared noise from the captured reflection of the pulse illumination, and the expected result of the pulse illumination can be used as demodulation reference signal.

In addition to one or more of the features described herein, the infrared light source can be controlled as s-polarized light.

In addition to one or more of the features described herein, the feature of interest can be an eye location of a user.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

In high-performance head-up displays (HUDs), such as augmented reality HUDs, and other systems, tracking the location of the eyes of a user can enable image improvement actions. For example, dynamic distortion compensation can be applied, where multiple locations within an eyebox associated with a HUD can have a unique distortion compensation file to maintain an undistorted view of imagery. Tracking a feature of interest, such as eye location/gaze position, can be used to reduce motion parallax (e.g., where an object appears different when viewed from different positions) and maintain augmented reality image registration. For example, as a user moves her/his head, a corresponding virtual image can move more than real image objects, which can destroy the illusion of augmented reality where virtual images and real image objects are fused. Tracking eye position can enable dynamic image fusion. Eye location tracking can also support selection of an appropriate image perspective, where a three-dimensional perspective of an image can be modified to maintain the illusion that a virtual image is real as the user moves. Embodiments of the systems and methods as further detailed herein relate to image processing and tracking of a feature of interest using an infrared camera, such as eye-location tracking for a HUD of a vehicle.

Figure 1:
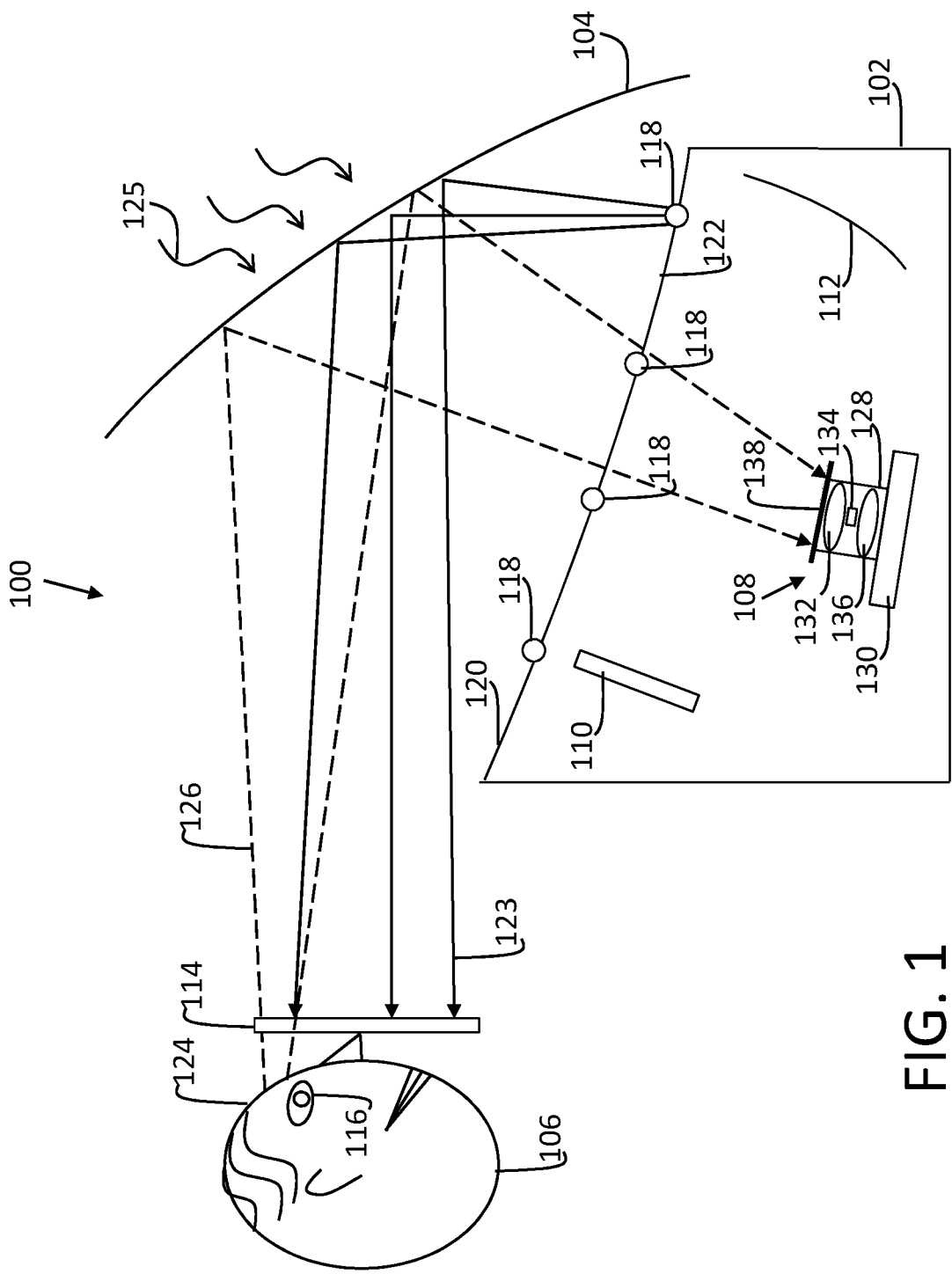
FIG. 1 is a block diagram of a tracking system with an infrared camera according to one or more embodiments.
Figure 3:
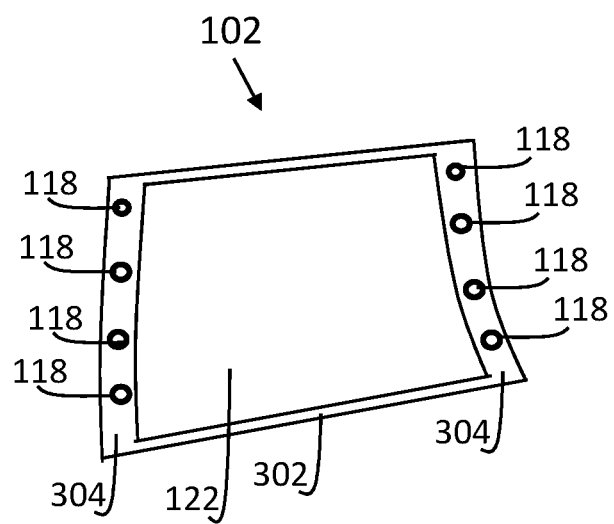
FIG. 3 is a schematic view of a housing of a head-up display system according to one or more embodiments.

In accordance with an exemplary embodiment, FIG. 1 is a block diagram of a portion of a vehicle 100 with a HUD 102. The vehicle 100 can be an automobile, truck, watercraft, aircraft, or any type of vehicle known in the art having a windshield 104. The HUD 102 may be in a recessed position such that it is not directly viewable by a user 106. An image capturing system 108 can be located within a housing (e.g., housing 302 of FIG. 3) of the HUD 102 along with a picture generating unit 110, and at least one mirror 112. The picture generating unit 110 can project a sequence of images upon the mirror 112, which reflects off the windshield 104 and is visible to the user 106 at eyebox 114. To track the location of a feature of interest 116 of the user 106, such as eye location, the image capturing system 108 works in conjunction with an infrared light source 118 that can include a plurality of light sources distributed along an edge 120 of a glare trap 122 of the HUD 102.

The glare trap 122 can include transparent material to allow light external to the HUD 102 to reach the image capturing system 108. The glare trap 122 may also have angled surfaces to reduce glare from various light sources. The infrared light source 118 can be external to the glare trap 122, as depicted, for example in FIG. 3, where the infrared light source 118 is distributed as a plurality of light sources along one or more outer edges 304 (e.g., edge 120) of a housing 302 of the HUD 102. Other locations or distribution patterns of the infrared light source 118 are contemplated.

With continued reference to FIG. 1, the infrared light source 118 can emit a plurality of infrared light beams 123 that reflect off the windshield 104 toward the eyebox 114. The infrared light source 118 can incorporate an optical component to assist in infrared beam forming to align with the size of the eyebox 114. The infrared light source 118 can emit infrared light using a vertical-cavity surface-emitting laser, a diode laser, a light-emitting diode, or other technology known in the art. The infrared light beams 123 can reflect off a surface 124 (e.g., a face) of the user 106 and the feature of interest 116 of the user 106. A reflection 126 of infrared light beams off the user 106 can be projected back to the windshield 104 and be further reflected to the image capturing system 108. The incident angle of the infrared beam on the windshield 104 can be designed to maximize reflectance. The image capturing system 108 may also detect other sources of radiation 125, such as sunlight passing through the windshield 104, which can appear as infrared noise. To improve image quality, the image capturing system 108 can include an optical spatial filter 128 operably coupled to an infrared camera 130, where the optical spatial filter 128 is configured to block light external to the eyebox 114. The optical spatial filter 128 can include a first lens 132, a filter 134, and a second lens 136. The optical spatial filter 128 can be tuned to focus on the eyebox 114 and block radiation from other sources outside of the eyebox 114. The illumination provided by the infrared light source 118 can be s-polarized light, and the infrared camera 130 can be configured to capture all polarizations.

The image capturing system 108 can also include a bandpass filter 138 operably coupled to the infrared camera 130, where the bandpass filter 138 is configured to filter non-infrared wavelengths. For instance, the bandpass filter 138 can be configured to allow wavelengths at or substantially close to 905 nm to pass through the bandpass filter 138. The optical spatial filter 128 and bandpass filter 138 can be arranged such that light received at the image capturing system 108 first passes through the bandpass filter 138 and then the optical spatial filter 128 prior to reaching the infrared camera 130. Alternatively, the placement of the optical spatial filter 128 and bandpass filter 138 may be reversed, such that light first passes through the optical spatial filter 128 and then the bandpass filter 138 prior to reaching the infrared camera 130. Collectively or individually, the optical spatial filter 128 and bandpass filter 138 provide an optical approach to noise suppression, while further noise suppression can be performed through digital image processing as further described in reference to FIGS. 2, 3, 4, 5, 6, and 7.

Figure 2:
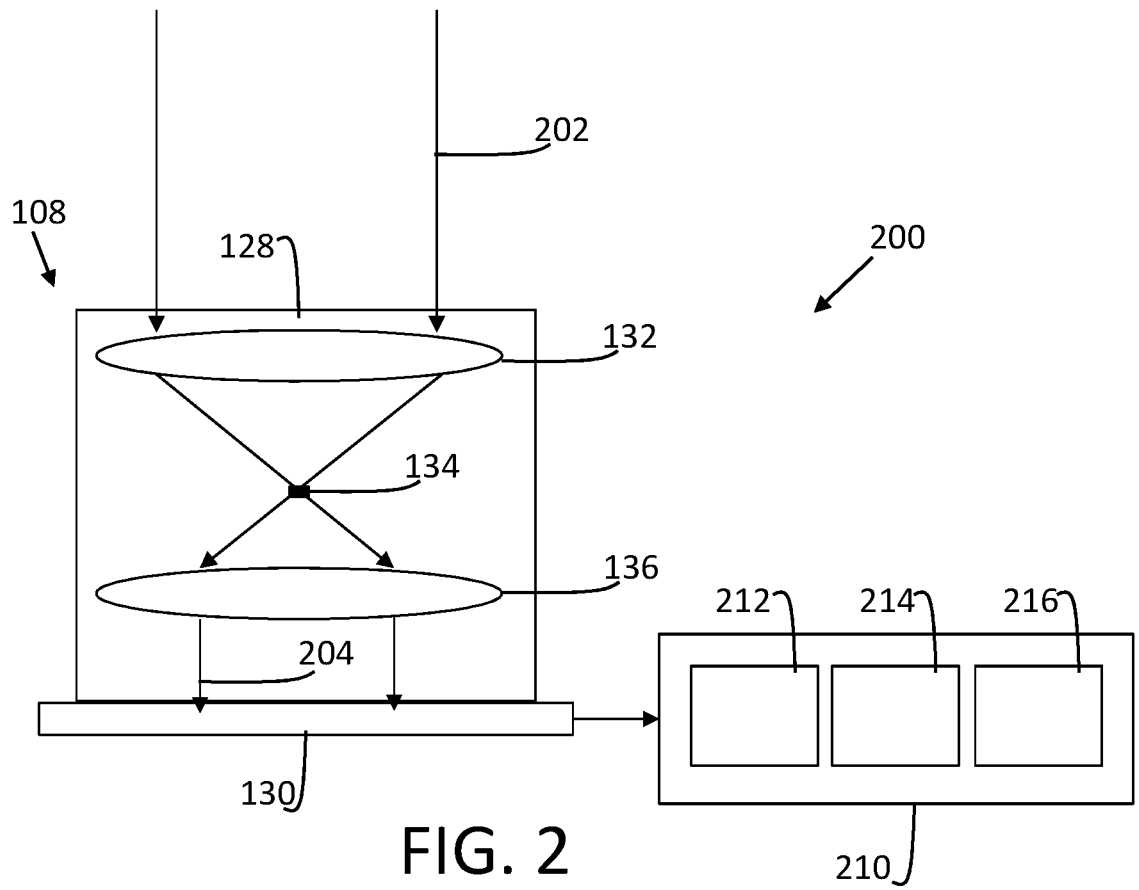
FIG. 2 is a block diagram of an image capturing system according to one or more embodiments.

FIG. 2 is a block diagram of a system 200 including the image capturing system 108 according to one or more embodiments. In the example of FIG. 2, the bandpass filter 138 is not depicted, as the bandpass filter 138 may be omitted in some embodiments. Light 202 received at the optical spatial filter 128 can include a combination of the reflection 126 of infrared light beams off the user 106, infrared noise from sources of radiation 125, and may include other non-infrared wavelengths if the bandpass filter 138 is omitted. The light 202 can pass through the first lens 132, the filter 134, and a second lens 136 such that spatially filtered light 204 reaches the infrared camera 130. A controller 210 can capture a sequence of images from the infrared camera 130 for further image processing. The controller 210 can include processing circuitry 212 that may include an application specific integrated circuit (ASIC), an electronic circuit, a processor (shared, dedicated, or group) and memory 214 that executes one or more software or firmware programs, a combinational logic circuit, and/or other suitable components that provide the described functionality. An input/output interface 216 can include circuitry to support driving various outputs, such as the infrared light source 118 of FIG. 1, the picture generating unit 110 of FIG. 1, and/or other devices (not depicted). The input/output interface 216 can also communicate with various vehicle systems and support receiving input from the infrared camera 130 and/or other devices (not depicted).

The controller 210 can use various image processing techniques to enhance images captured in the memory 214 to filter infrared noise and improve the accuracy of location tracking algorithms that track the location of a feature of interest 116 of the user 106. Eye location can be determined using known processing techniques. For example, infrared or near-infrared light directed towards the pupil of the eye results in visible reflections in the cornea of the eye. The eye reflections between the cornea and pupil form a vector that can be tracked to determine gaze direction. Eye location recognition may use machine learning or other approaches to identify facial features of the user 106 of FIG. 1, including the feature of interest 116 of FIG. 1.

Figure 4:
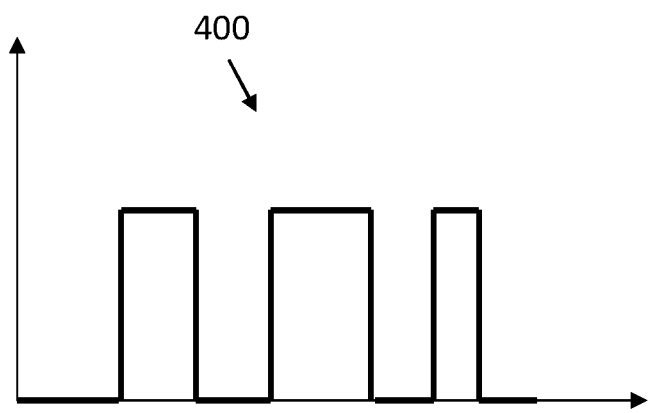
FIG. 4 is an intensity plot of pulse illumination of an infrared light source according to one or more embodiments.
Figure 5:
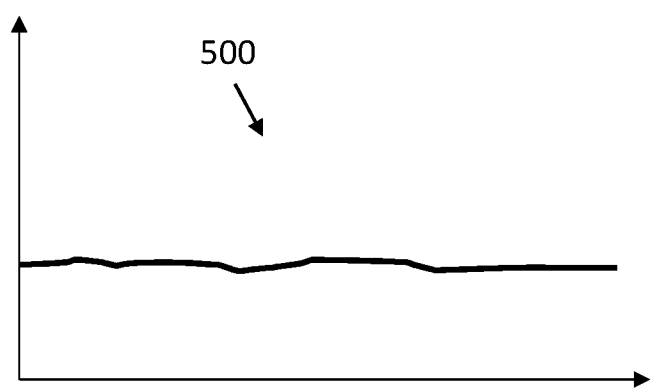
FIG. 5 is an intensity plot of infrared noise according to one or more embodiments.
Figure 6:
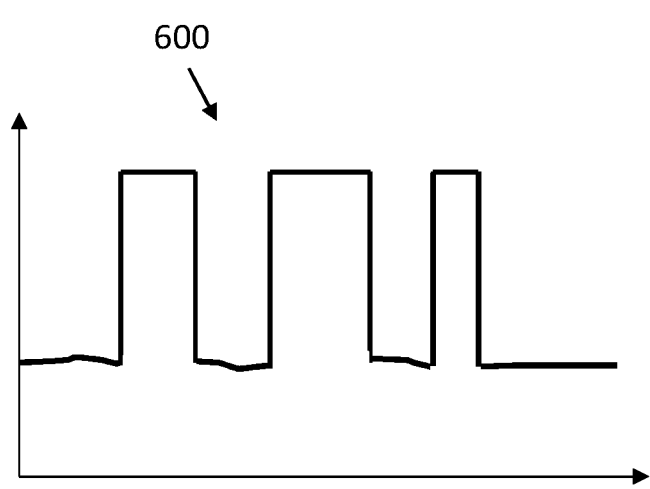
FIG. 6 is a camera response plot of pulse illumination of an infrared light source with infrared noise according to one or more embodiments.

An example of image processing techniques that can be implemented by the image capturing system 108 includes a lock-in amplifier for noise suppression. Flashing the eyebox 114 of FIG. 1 by reflection from the windshield 104 of FIG. 1 can be controlled by pulse illumination of the infrared light source 118, for instance, as driven by the controller 210. The surface 124 (e.g., face) of the user 106 within eyebox 114 becomes a secondary diffused infrared light source reflected off the windshield 104 as an infrared image that is further optically filtered and captured by the image capturing system 108. FIGS. 4, 5, and 6 depict example plots 400, 500, 600, where plot 400 is an intensity plot of pulse illumination of infrared light source 118 with respect to time, plot 500 is an intensity plot of infrared noise (e.g., from sources of radiation 125 of FIG. 1) with respect to time, and plot 600 is a camera response plot of pulse illumination of an infrared light source with infrared noise with respect to time. The pulse illumination of the infrared light source 118 provides a reference signal that can be detected in the sequence of images captured by the infrared camera 130 and may appear shifted as the underlying infrared noise can act as a "DC" offset (e.g., plot 600). Frequency domain analysis can be used to filter out the infrared noise. For instance, the pulse illumination may appear as a carrier frequency that modulates the infrared noise at a predetermined frequency. An expected result of the pulse illumination can be compared to the captured reflection of the pulse illumination at the frequency of pulse illumination, and the difference may be quantified as a noise floor of the infrared noise to be filtered out. Further, the image analysis to identify the feature of interest 116 can be isolated to image frames where increased infrared intensity is present due to the pulse illumination. Other image enhancements may also be performed.

Figure 7:
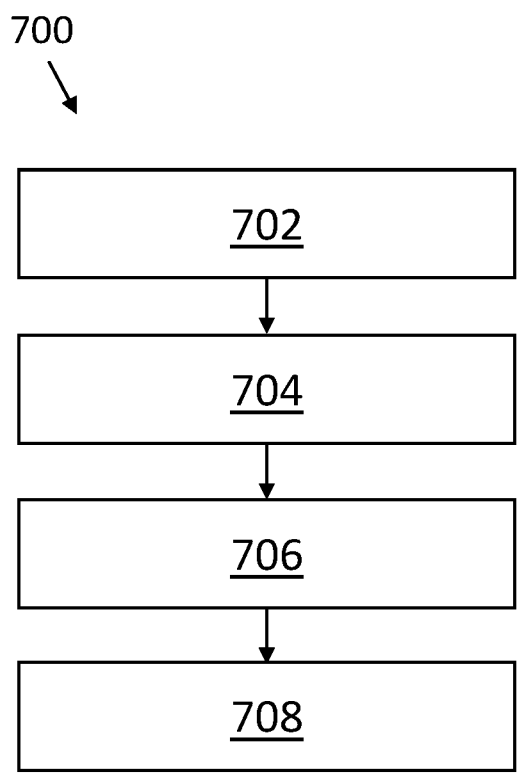
FIG. 7 is a process flow of a method of tracking a feature of interest using an infrared camera according to one or more embodiments.

FIG. 7 is a process flow of a method 700 of tracking a feature of interest 116 using an image capturing system 108 with an infrared camera 130 according to one or more embodiments. The method 700 is described in reference to FIGS. 1-7. As shown in FIG. 1, the image capturing system 108 may be in a vehicle 100. At block 702, the controller 210 can control a pulse illumination of the infrared light source 118 in the vehicle 100. At block 704, the controller 210 can capture a sequence of images from the infrared camera 130, where the sequence of images includes infrared noise combined with a captured reflection of the pulse illumination. The infrared light source 118 can be configured to reflect off a windshield 104 of the vehicle 100 including HUD 102 to an eyebox 114 defining an expected viewing area of a user 106, and the captured reflection can include infrared light reflected off of the user 106 and the windshield 104.

At block 706, the controller 210 can filter the infrared noise from the sequence of images based on a comparison of the captured reflection of the pulse illumination to an expected result of the pulse illumination. Filtering can also include optical filtering, such as inclusion of an optical spatial filter 128 operably coupled to the infrared camera 130, where the optical spatial filter 128 is configured to block light external to the eyebox 114. A bandpass filter 138 can be operably coupled to the infrared camera 130, where the bandpass filter 138 is configured to filter non-infrared wavelengths. Filtering the infrared noise from the sequence of images may include performing a frequency domain analysis of the sequence of images to demodulate the infrared noise from the captured reflection of the pulse illumination, and the expected result of the pulse illumination can be used as demodulation reference signal.

At block 708, the controller 210 can track a feature of interest 116 in the sequence of images after filtering of the infrared noise. Eye tracking position information can be provided to refine display parameters of the picture generating unit 110 can improvement image alignment with the eye position of the user 106. Adjustments to image rendering by the picture generating unit 110 can be made in real-time as changes in the eye position of the user 106 are detected.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system comprising:
an infrared light source;
an infrared camera; and
a controller comprising processing circuitry configured to control a pulse illumination of the infrared light source, capture a sequence of images from the infrared camera comprising infrared noise combined with a captured reflection of the pulse illumination, filter the infrared noise from the sequence of images based on a comparison of the captured reflection of the pulse illumination to an expected result of the pulse illumination, and track a feature of interest in the sequence of images after filtering of the infrared noise.

2. The system according to claim 1, wherein the infrared light source, the infrared camera, and the controller are associated with a head-up display.

3. The system according to claim 2, wherein the infrared light source is configured to reflect off a windshield of a vehicle comprising the head-up display to an eyebox defining an expected viewing area of a user, and the captured reflection comprises infrared light reflected off of the user and the windshield.

4. The system according to claim 3, wherein the infrared light source is coupled to a housing of the head-up display, and the infrared camera is within the housing of the head-up display.

5. The system according to claim 4, wherein the infrared light source is distributed as a plurality of light sources along an outer edge of the housing.

6. The system according to claim 3, further comprising:
an optical spatial filter operably coupled to the infrared camera, wherein the optical spatial filter is configured to block light external to the eyebox.

7. The system according to claim 6, further comprising:
a bandpass filter operably coupled to the infrared camera, wherein the bandpass filter is configured to filter non-infrared wavelengths.

8. The system according to claim 1, wherein filtering the infrared noise from the sequence of images comprises performing a frequency domain analysis of the sequence of images to demodulate the infrared noise from the captured reflection of the pulse illumination, and the expected result of the pulse illumination is used as demodulation reference signal.

9. The system according to claim 1, wherein the infrared light source is controlled as s-polarized light.

10. The system according to claim 1, wherein the feature of interest comprises an eye location of a user.

11. A method comprising:
controlling a pulse illumination of an infrared light source;
capturing a sequence of images from an infrared camera, the sequence of images comprising infrared noise combined with a captured reflection of the pulse illumination;
filtering the infrared noise from the sequence of images based on a comparison of the captured reflection of the pulse illumination to an expected result of the pulse illumination; and
tracking a feature of interest in the sequence of images after filtering of the infrared noise.

12. The method according to claim 11, wherein the infrared light source, the infrared camera, and the controller are associated with a head-up display.

13. The method according to claim 12, wherein the infrared light source is configured to reflect off a windshield of a vehicle comprising the head-up display to an eyebox defining an expected viewing area of a user, and the captured reflection comprises infrared light reflected off of the user and the windshield.

14. The method according to claim 13, wherein the infrared light source is coupled to a housing of the head-up display, and the infrared camera is within the housing of the head-up display.

15. The method according to claim 14, wherein the infrared light source is distributed as a plurality of light sources along an outer edge of the housing.

16. The method according to claim 13, further comprising:
blocking light external to the eyebox by an optical spatial filter operably coupled to the infrared camera.

17. The method according to claim 16, further comprising:
filtering non-infrared wavelengths by a bandpass filter operably coupled to the infrared camera.

18. The method according to claim 11, wherein filtering the infrared noise from the sequence of images comprises performing a frequency domain analysis of the sequence of images to demodulate the infrared noise from the captured reflection of the pulse illumination, and the expected result of the pulse illumination is used as demodulation reference signal.

19. The method according to claim 11, wherein the infrared light source is controlled as s-polarized light.

20. The method according to claim 11, wherein the feature of interest comprises an eye location of a user.

* * * * *